(12) United States Patent
Huang et al.

(10) Patent No.: US 11,956,018 B2
(45) Date of Patent: Apr. 9, 2024

(54) QUANTIZER AND OPTICAL TRANSMITTER

(71) Applicant: FUJITSU LIMITED, Kawasaki (JP)

(72) Inventors: Guoxiu Huang, Kawasaki (JP); Hisao Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/899,663

(22) Filed: Aug. 31, 2022

(65) Prior Publication Data

US 2023/0188217 A1 Jun. 15, 2023

(30) Foreign Application Priority Data

Dec. 9, 2021 (JP) .................................. 2021-200343

(51) Int. Cl.
*H04B 10/50* (2013.01)
*H04B 10/40* (2013.01)
*H04B 10/60* (2013.01)

(52) U.S. Cl.
CPC .............. *H04B 10/50* (2013.01); *H04B 10/40* (2013.01); *H04B 10/60* (2013.01)

(58) Field of Classification Search
None
See application file for complete search history.

(56) References Cited

U.S. PATENT DOCUMENTS

| 4,797,902 A * | 1/1989 | Nishiguchi | H03M 7/3053 375/245 |
| 6,384,761 B1 * | 5/2002 | Melanson | H03M 1/0668 341/118 |
| 10,033,400 B1 | 7/2018 | Mallett | |
| 2004/0184621 A1 * | 9/2004 | Andersen | H03G 3/002 381/94.5 |
| 2010/0289546 A1 * | 11/2010 | Dooper | H03M 5/08 327/172 |

FOREIGN PATENT DOCUMENTS

| JP | 2009-524086 A | 6/2009 |
| WO | 2007/084894 A2 | 7/2007 |

OTHER PUBLICATIONS

Yaron Yoffe et al., "Low-Resolution Digital Pre-Compensation for High-Speed Optical Links Based on Dynamic Digital-to-Analog Conversion", Journal of Lightwave Technology, vol. 37, No. 3, pp. 882-888, Feb. 1, 2019 (Total 7 pages).

* cited by examiner

*Primary Examiner* — Darren E Wolf
(74) *Attorney, Agent, or Firm* — Fujitsu Intellectual Property Center

(57) ABSTRACT

A quantizer includes: a clipper configured to clip a portion exceeding a quantization range of a sample value sampled at a predetermined rate; and a noise shaper configured to determine a plurality of candidates for a quantization level based on the clipped sample value, and outputs, as a quantization value, a value obtained by adding a minimum noise in which a noise in a low-frequency region is minimum among noises generated in each candidate to the sample value before clipping.

9 Claims, 19 Drawing Sheets

FIG. 6
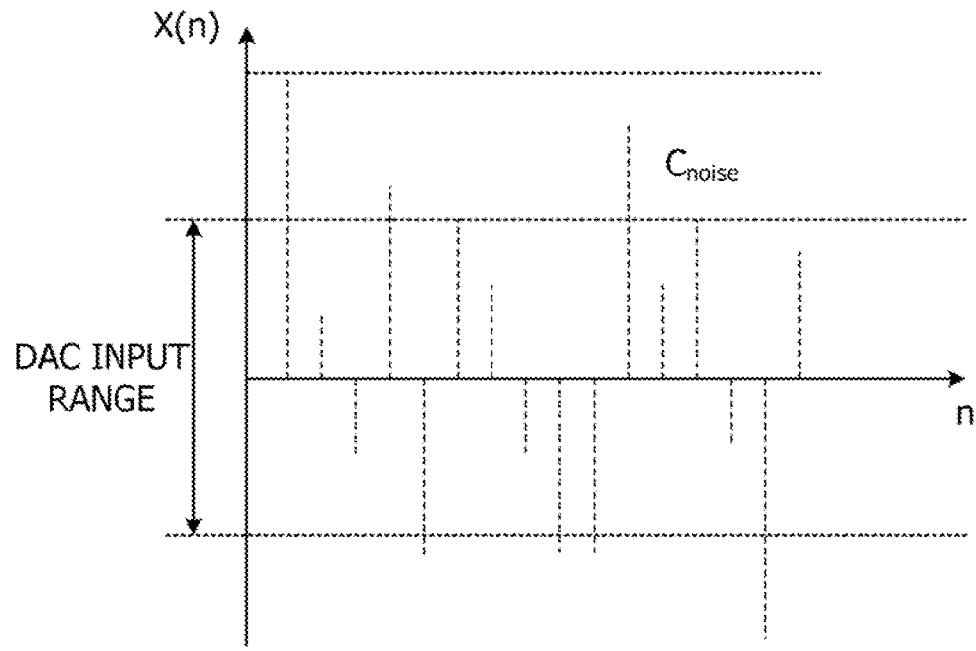
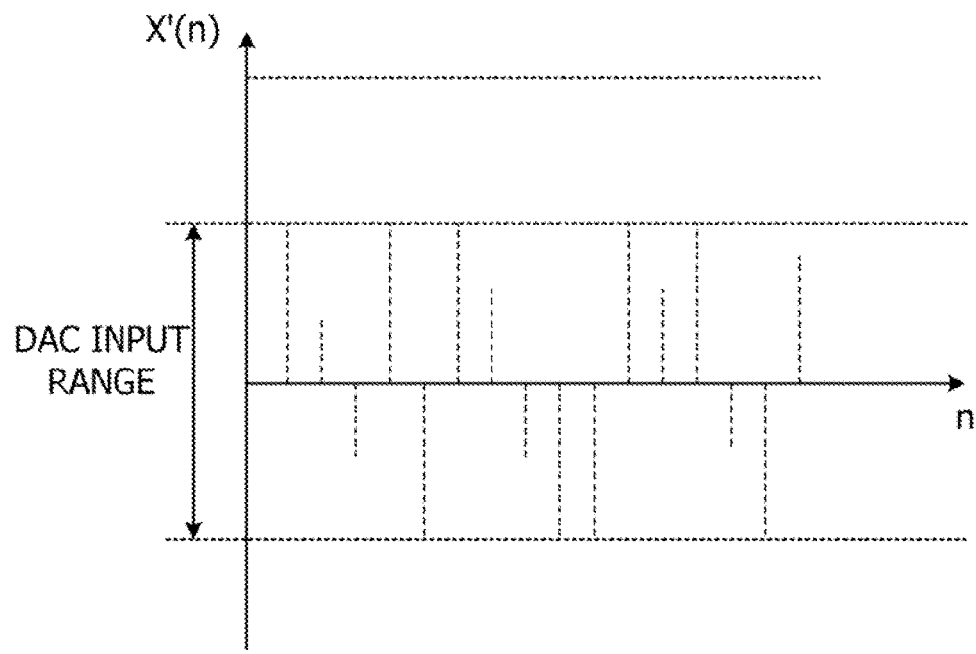

QUANTIZER AND OPTICAL TRANSMITTER

CROSS-REFERENCE TO RELATED APPLICATION

This application is based upon and claims the benefit of priority of the prior Japanese Patent Application No. 2021-200343, filed on Dec. 9, 2021, the entire contents of which are incorporated herein by reference.

FIELD

The embodiment discussed herein is related to a quantizer and an optical transmitter.

BACKGROUND

In recent years, in order to achieve a flexible data rate, a multi-level modulation scheme using probabilistic constellation shaping (PCS) or multi-level modulation for large-capacity short-distance communication is being put into practical use. As the amount of information to be transmitted, for example, a baud rate is increased, a demand for bit resolution of a digital-to-analog converter (DAC) of an optical transmitter is also increased. Meanwhile, the bit resolution of the DAC is limited. Further, as the bit resolution of the DAC is lower, power consumption may be suppressed and a design may be facilitated.

Yaron Yoffe, Eyal Wohlgemuth, Dann Sadot, Digitally EnhancedDAC: Low Resolution Digital Pre-Compensation for High Speed Optical Links, Optical Society of America, 2018 is disclosed as related art.

SUMMARY

According to an aspect of the embodiments, a quantizer includes: a clipper configured to clip a portion exceeding a quantization range of a sample value sampled at a predetermined rate; and a noise shaper configured to determine a plurality of candidates for a quantization level based on the clipped sample value, and outputs, as a quantization value, a value obtained by adding a minimum noise in which a noise in a low-frequency region is minimum among noises generated in each candidate to the sample value before clipping.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a schematic diagram of a clipping process.

DESCRIPTION OF EMBODIMENTS

In digital coherent optical communication in which a digital signal process and coherent optical transmission are combined, a quantization noise occurs in the process of DAC quantization. The quantization noise is an error in DAC quantization. Even when a level or the baud rate of the modulation scheme becomes high, it is desirable to be able to handle the DAC having low-bit resolution by reducing the quantization noise.

Figure 1:
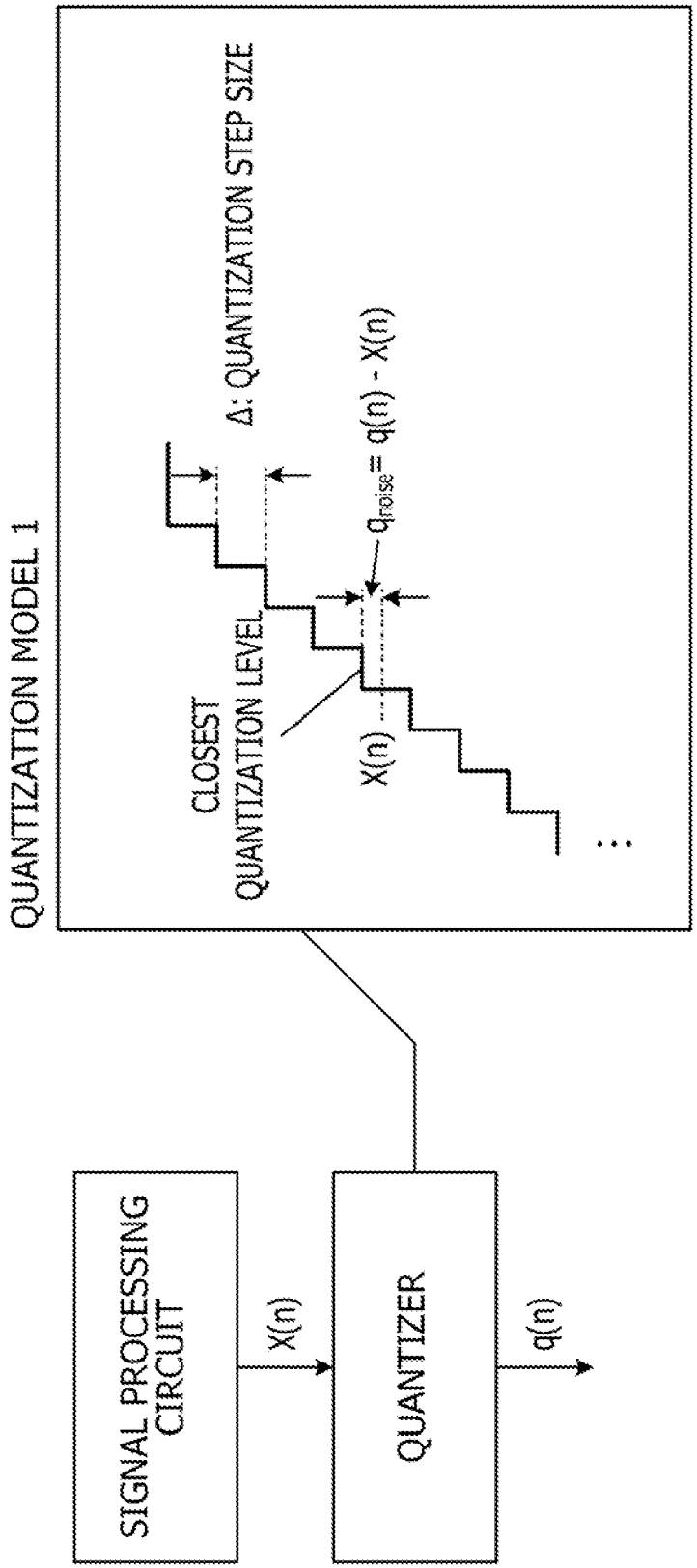
FIG. 1 is a schematic diagram of a quantization model 1.

FIG. 1 illustrates a general quantization model 1. A sample value $X(n)$ sampled by a signal processing circuit is rounded up or down to the closest quantization level within a quantization range. A distance $\Delta$ between quantization levels is referred to as a quantization step size. An error between the sample value $X(n)$ before quantization and a value $q(n)$ after quantization is a quantization noise $q_{noise}$. The quantization noise has white noise characteristics that are flat with respect to a frequency axis.

Figure 2:
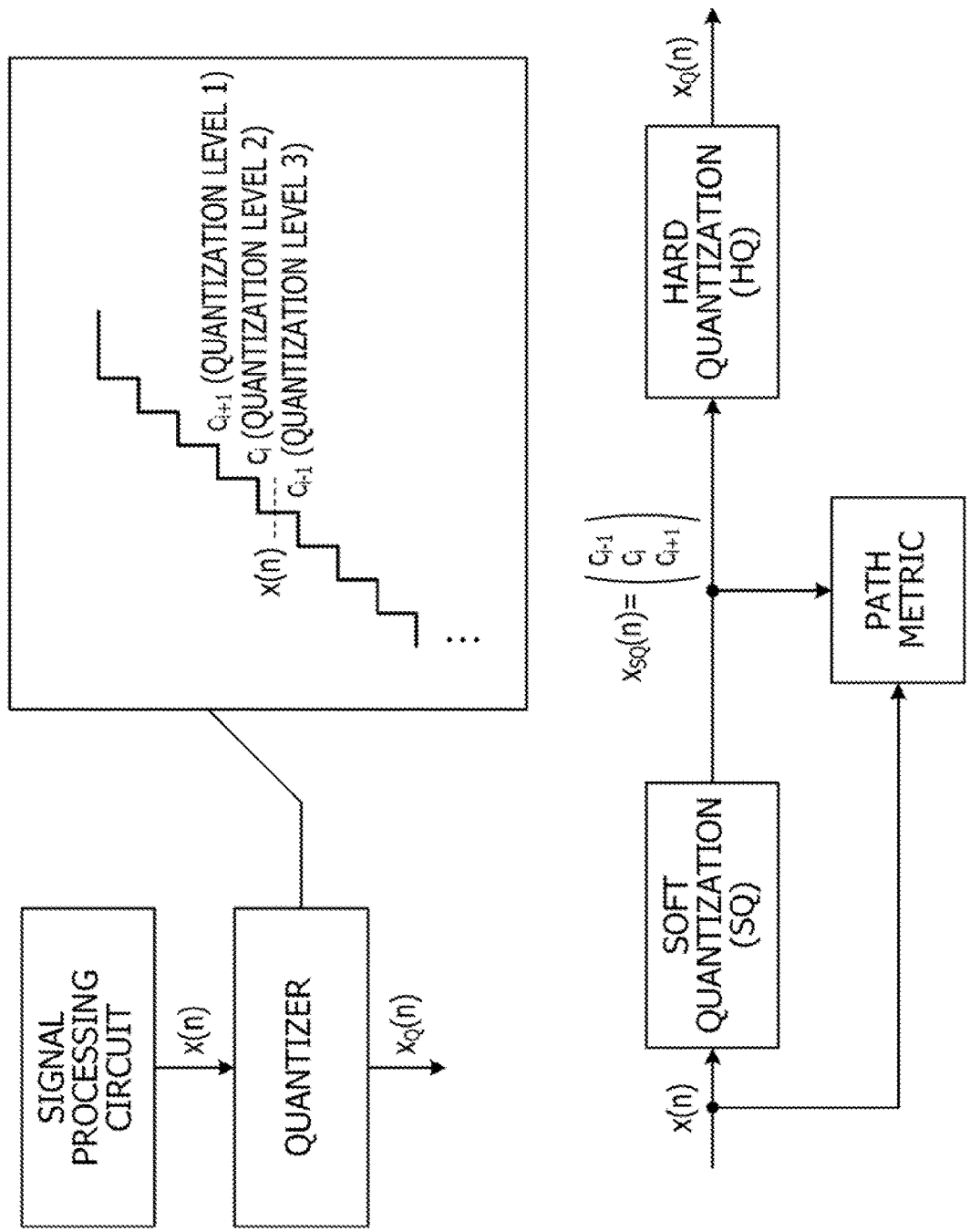
FIG. 2 is a schematic diagram of a quantization model 2.

FIG. 2 illustrates a quantization model 2. With soft quantization (SQ), three candidates $c_{i-1}$, $c_i$, and $c_{i+1}$ are determined by including the quantization level 2 closest to the sampling output $x(n)$ and the quantization levels 1 and 3 above and below the quantization level 2. With path metric calculation, a quantization error is calculated for each of the three candidates. With hard quantization (HQ), a candidate having the minimum mean square error in low frequency domain over three candidates is selected, and a quantization value $x_Q(n)$ is output.

Even when the level or the baud rate of the modulation scheme is increased, an analog voltage signal with a small error may be generated by a DAC of which a bit resolution is not high as long as the quantization noise may be suppressed. According to one aspect, an object of the present disclosure is to provide a technique for reducing a quantization noise.

Hereinafter, a configuration and a method of embodiments will be described with reference to the drawings. Hereinafter, the same configuration components are denoted by the same reference signs, and redundant description thereof will be omitted, in some cases.

Figure 3:
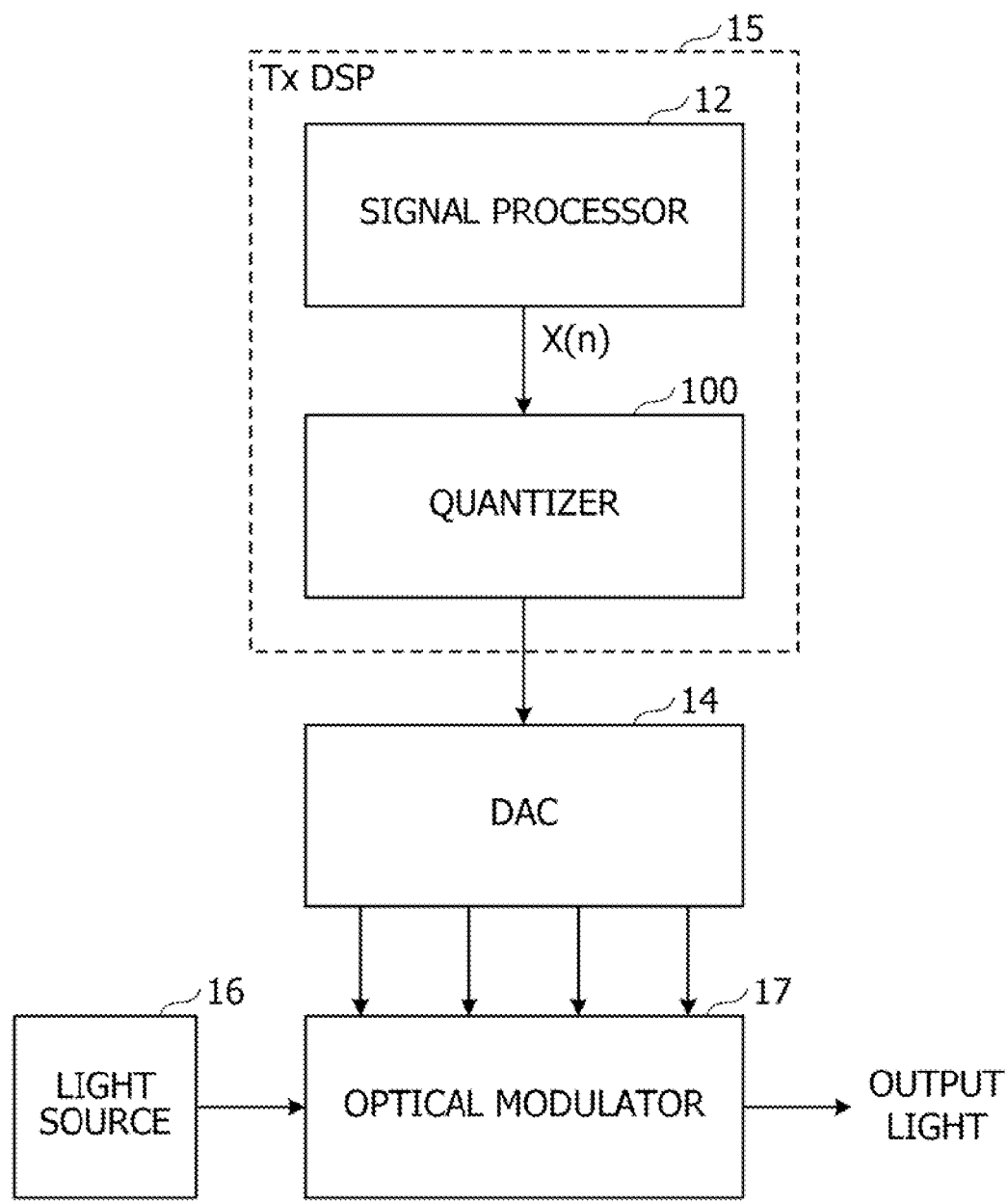
FIG. 3 is a block diagram of an optical transmitter to which a quantizer according to an embodiment is applied.

FIG. 3 is a block diagram of an optical transmitter 10 to which a quantizer 100 according to the embodiment is applied. The optical transmitter 10 includes a signal processor 12, the quantizer 100, a DAC 14, a light source (denoted by "LD" in FIG. 3) 16, and an optical modulator 17. The quantizer 100 may be included in an integrated circuit substrate of a digital signal processor (DSP) 15 together with the signal processor 12, or may be realized by an application-specific integrated circuit (ASIC) separate from the signal processor 12. In FIG. 3, "Tx DSP" indicates the DSP 15, in the sense of performing a process on a transmitter side.

The sample value X(n) sampled by the signal processor 12 is quantized by the quantizer 100, and input to the DAC 14 as digital data. The sample value X(n) is a numerical value representing an amplitude at a sampling point, whereas digital data output from the quantizer 100 represents an integer value such as "0" or "1". The DAC 14 converts the input digital data into an analog voltage signal. Based on the output of the DAC 14, a drive signal is generated by a modulator driver amplifier (not illustrated), and input to a signal electrode of the optical modulator 17.

For example, the optical modulator 17 is a modulator of a dual polarization quadrature phase shift keying (DP-QPSK) method and includes an IQ modulator formed by a Mach-Zehnder (MZ) interferometer for each of X-polarization and Y-polarization. Four analog voltage signals are output from the DAC 14, and drive signals are input to an I-arm and a Q-arm for X-polarization and an I-arm and a Q-arm for Y-polarization.

A carrier wave output from the light source 16 is split into X-polarization and Y-polarization, and each arm of the corresponding IQ modulator receives phase modulation in accordance with a change in refractive index. An optical signal on which intensity modulation is performed by interference between the slave MZ interferometer forming each arm and the master MZ interferometer in which the slave MZ interferometer is nested is output from the optical modulator 17.

Figure 4:
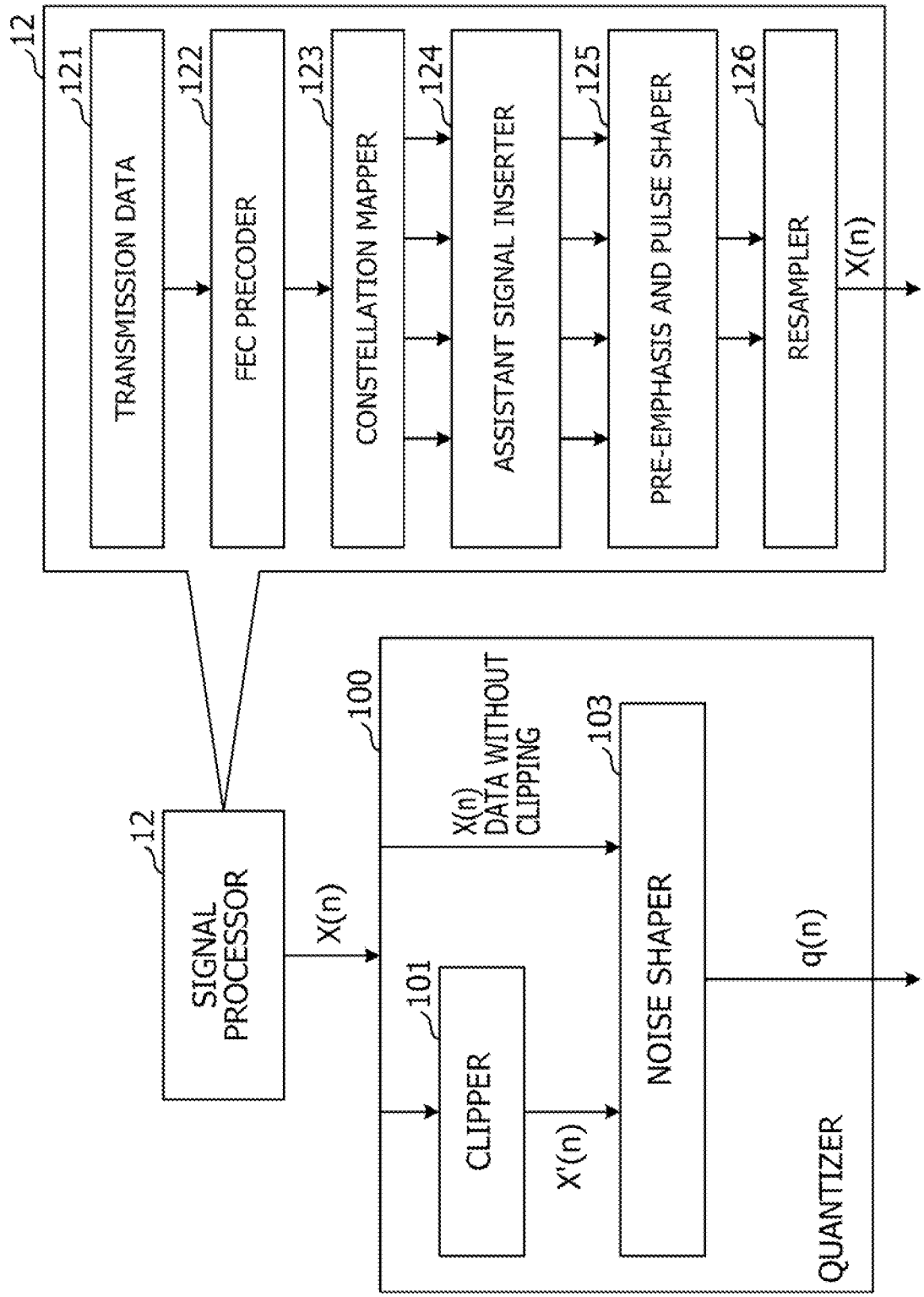
FIG. 4 is a diagram illustrating a basic configuration of the quantizer and a signal processing circuit.

FIG. 4 illustrates a basic configuration of the quantizer 100 and the signal processor 12. Transmission data 121 is input to the signal processor 12. The transmission data is, for example, a binary bit string. An error correction coding process is performed on the transmission data 121 by a forward error correction (FEC) precoder 122, and the transmission data 121 is mapped to a symbol point over a constellation (IQ complex plane) by a constellation mapper 123. At this time, probability distribution shaping of the symbol point may be performed.

An assistant signal inserter 124 inserts a known assistant signal into each symbol point. The assistant signal is used to estimate a transmission line status such as an OSNR. A pre-emphasis and pulse shaper 125 performs pre-emphasis of compensating for signal attenuation in advance and pulse shaping for each polarization.

A resampler 126 samples a shaped waveform at a predetermined sampling rate. The resampler 126 performs oversampling at a sampling rate higher than an original frequency of the signal, and causes the signal processor 12 to output the sample value X(n). n is a number over a time axis. For example, the sample value X(n) obtained by oversampling a pulse train of 60 gigabaud by two times is input to the quantizer 100.

The quantizer 100 includes a clipper 101 and a noise shaper 103. The clipper 101 clips a portion exceeding a quantization range of the sample value X(n) sampled at a predetermined rate. The noise shaper 103 determines a plurality of candidates for a quantization level based on the sample value clipped by the clipper 101, and outputs, as a quantization value, a value obtained by adding the minimum noise in which a noise in a low-frequency region is minimum, among noises generated in each candidate to the sample value before clipping.

When a transmission signal exceeding a maximum input voltage range of the DAC 14 is generated, the transmission signal has to be clipped at a stage of quantization, in some cases. Meanwhile, since distortion occurs in the output of the DAC 14 due to clipping, the sample value X(n) is generally set to be within the maximum input voltage range of the DAC 14.

With the embodiment, the sample value X(n) is expanded in an amplitude direction so that the sample value X(n) input to the quantizer 100 is larger than the maximum input voltage range of the DAC 14, for example, a quantization range of the quantizer 100. The expansion of the sample value X(n) may be performed before the sample value X(n) is input to the quantizer 100 or may be performed inside the quantizer 100. In the latter case, an expander that expands the input sample waveform in the amplitude direction may be provided inside the clipper 101.

The clipper 101 clips a portion, exceeding the maximum input voltage range of the DAC 14, for example, the quantization range, of the input sample value X(n). A clipping coefficient is set to an appropriate value such as 0.7 (clipping of 30%) or 0.8 (clipping of 20%). Data after clipping is denoted by X'(n). Due to clipping, an error from the actual sample value X(n), for example, a clipping noise is generated.

The noise shaper 103 shapes a noise of the data X'(n) after clipping by using the sample value X(n) before the clipping. The noise of the data after the clipping includes a clipping noise and a quantization noise. The noise shaper 103 extracts a plurality of candidates for the quantization level for the data X'(n) after the clipping of the current symbol. The number of candidates is set in advance in consideration of a bit resolution of the DAC 14. A difference between the quantization level of each candidate and the sample value X(n) before clipping is calculated. This difference is a total noise obtained by adding the clipping noise and the quantization noise.

By performing a filter process of extracting a low-frequency component, the noise shaper 103 removes a high-frequency component from the total noise, and selects a quantization level with which the total noise is minimized in a low-frequency region. Therefore, the quantization noise is reduced to handle the bit resolution of the DAC 14. Although a peak of the waveform of the sample value X(n) is cut off by clipping, the resolution becomes high within the input voltage range of the DAC 14, and as a result, the quantization noise is reduced. The cut-off peak is the clipping noise, and is added to the quantization noise.

A sum of the clipping noise and the quantization noise may be calculated from a difference between the data X'(n) after clipping and the sample value X(n) before the clipping. By selecting the extracted candidate for the quantization level of the DAC for the data X'(n) after the clipping by the shaping technique, it is possible to reduce low-frequency components of the clipping noise and the quantization noise within the input range of the DAC. Although high-frequency noise components are enlarged, a noise outside the main signal spectrum is cut since the equalizer of the reception DSP is an ideal filter. Therefore, only the noise included in the signal spectrum remains, and only the noise component affects the main signal. A specific operation and a more detailed process configuration of the quantizer 100 will be described below.

Figure 5:
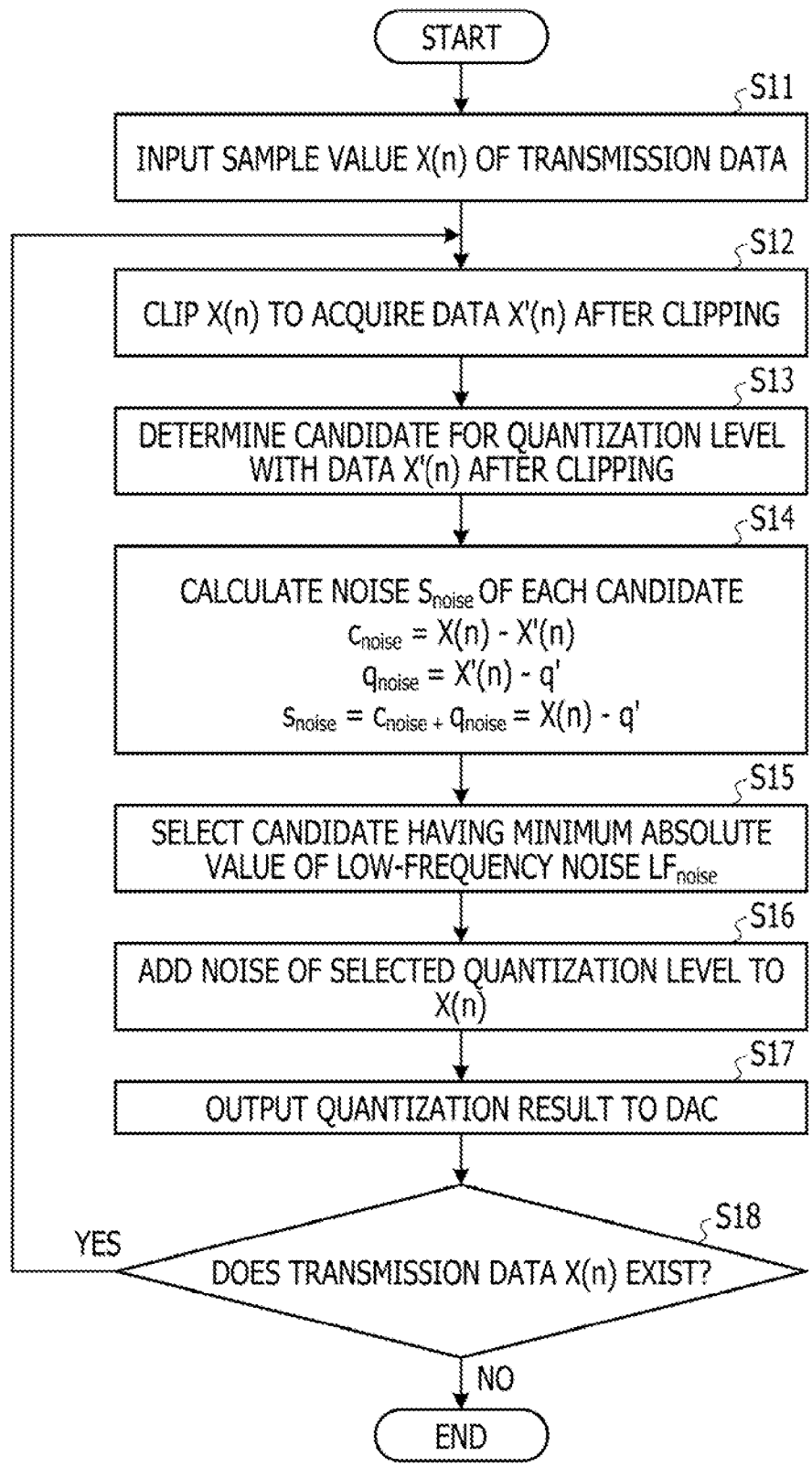
FIG. 5 is a flowchart of a quantization process.

FIG. 5 is a flowchart of a quantization process performed in the quantizer 100. First, the sample value X(n) of a current symbol is input (S11). The sample value X(n) is amplitude data resampled by the signal processor 12. After that, the sample value X(n) is clipped to acquire data X'(n) after clipping (S12). As desired, a waveform of the sample values X(n) may be expanded in an amplitude direction before the clipping.

Next, a plurality of quantization level candidates are determined by using the data X'(n) after the clipping (S13), and a noise $S_{noise}$ of each candidate is calculated (S14).

The noise $S_{noise}$ is a total value of a clipping noise $c_{noise}$ and the quantization noise $q_{noise}$. The clipping noise $c_{noise}$ is represented by a difference between the input sample value X(n) and the data X' after clipping(n). The quantization noise $q_{noise}$ is represented by a difference between the data X'(n) after clipping and a quantization level q' of each candidate. Therefore, the total noise $S_{noise}$ is represented by X(n)−q'.

$c_{noise}=X(n)-X'(n)$ $q_{noise}=X'(n)-q'$ $S_{noise}=X(n)-q'$

A quantization level having the minimum absolute value of a low-frequency noise $LF_{noise}$ included in the noise $S_{noise}$ is selected among the plurality of quantization level candidates (S15). The noise $S_{noise}$ of the selected quantization level (for example, noise having the minimum noise in a low-frequency region) is added to the sample value X(n) before clipping (S16), and the result is output as a final quantization result (S17). This output is coupled to an input of the DAC 14. It is determined whether or not the next transmission data (sample value) exists (S18), and steps S12 to S17 are repeated as long as the transmission data exists. In a case where there is no input of transmission data (No in S18), the process is ended.

FIG. 6 is a schematic diagram of the clipping process in step S12. The sample value X(n) on which the clipping process is performed by the clipper 101 of the quantizer 100 is expanded in an amplitude direction such that the amplitude exceeds the maximum input voltage range of the DAC 14. A waveform of the sample value X(n) is expanded in the amplitude direction inside or outside the quantizer 100. A portion of the sample value X(n) exceeding the maximum input voltage range of the DAC 14 is clipped, and data X'(n) within the maximum input voltage range of the DAC 14 is obtained. An error caused by the clipping is the clipping noise $c_{noise}$.

Figure 7:
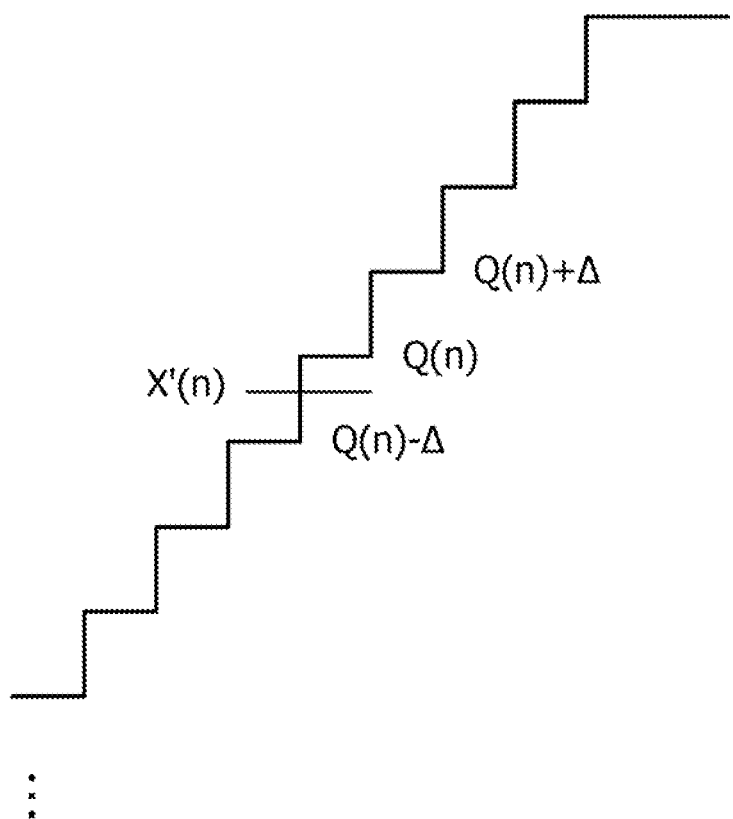
FIG. 7 is a diagram illustrating an example in which three quantization level candidates are used.

FIG. 7 is a schematic diagram of the quantization level candidate determination in step S13. A quantization level candidate is determined for the data X'(n) after clipping. In this example, a quantization level Q(n) closest to the data X'(n) and the quantization level Q(n)+Δ and the quantization level Q(n)−Δ above and below the quantization level Q(n) are used as candidates. Δ is a step size of quantization.

Figure 8:
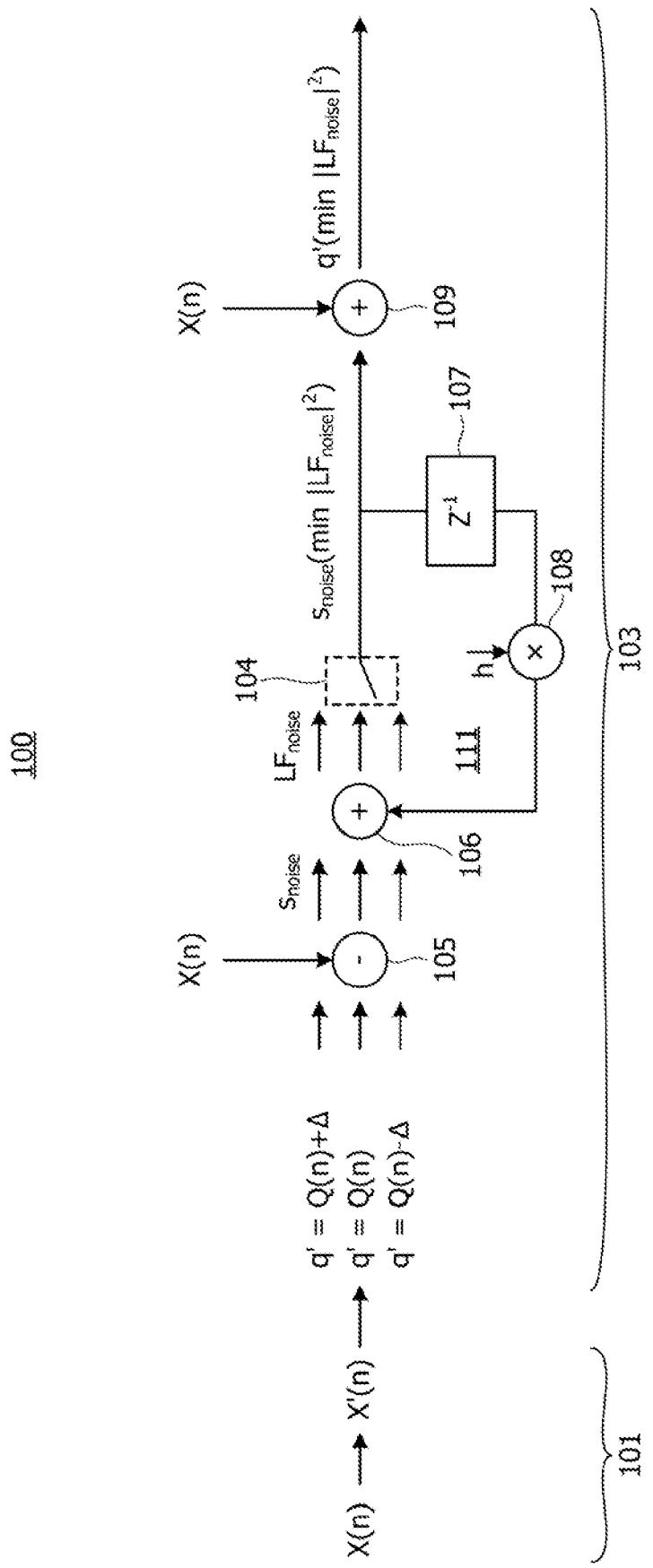
FIG. 8 is a diagram illustrating a specific process configuration of the quantizer.

FIG. 8 illustrates a specific process configuration of the quantizer 100. A portion, exceeding a predetermined level, of the sample values X(n) input to the quantizer 100 is clipped by the clipper 101. Based on the data X'(n) after the clipping, the noise shaper 103 determines a plurality of, for example, three candidates for the quantization level. Each quantization level q', which is the candidate, is obtained as follows.

$q'=Q(n)+\Delta$ $q'=Q(n)$ $q'=Q(n)-\Delta$, Q(n) is a quantization level closest to X(n), and Δ is a quantization step size.

The noise shaper 103 inputs the quantization level q' of each candidate and the sample value X(n) before clipping to a subtractor 105, and calculates a difference as the noise $S_{noise}$ of each candidate. By filtering the noise $S_{noise}$ of each candidate, the low-frequency noise $LF_{noise}$ is extracted, and the noise $S_{noise}$ (min|$LF_{noise}$|$^2$) in which the low-frequency noise $LF_{noise}$ is minimized is selected by the selector 104. The $S_{noise}$(min|$LF_{noise}$|$^2$) in which the noise in this low-frequency region is minimized is referred to as a "minimum noise" for convenience.

In the filter process, a delayer 107 delays the selected minimum noise $S_{noise}$ (min|$LF_{noise}$|$^2$) by one symbol cycle. The multiplier 108 multiplies the minimum noise $S_{noise}$ (min|$LF_{noise}$|$^2$) before one symbol by the coefficient h, and feeds back the result to the current noise $S_{noise}$. The minimum noise $S_{noise}$(min|$LF_{noise}$|$^2$) before one symbol to be fed back is to shape the combination of clipping noise and quantization to be minimized in the low-frequency region.

The minimum noise $S_{noise}$(min|$LF_{noise}$|$^2$) before one symbol is added to the noise $S_{noise}$ of each current candidate by the adder 106. Therefore, the high-frequency components of the noise of each candidate are canceled, and the low-frequency noise $LF_{noise}$ is extracted. The selector 104 selects the minimum noise from the current low-frequency noise $LF_{noise}$, supplies the selected minimum noise $S_{noise}$(min|$LF_{noise}$|$^2$) to the adder 109 in a subsequent stage, and repeats the feedback process.

A feedback circuit formed by the adder 106, the delayer 107, and the multiplier 108 forms a one-tap filter 111. The coefficient h set in the multiplier 108 may be referred to as a "tap coefficient h". By reflecting the noise shaped before one symbol in the noise $S_{noise}$ in this time, the one-tap filter 111 functions as a low-pass filter or a feedback equalizer that cuts a high-frequency noise.

The noise $S_{noise}$(min|$LF_{noise}$|$^2$) in this time selected by the selector 104 is added to the sample value X(n) before clipping by the adder 109. By this addition, the input sample value X(n) is quantized to the quantization level q'(min|$LF_{noise}$|$^2$) having the minimum noise in the low-frequency region.

The quantization level q'(min|$LF_{noise}$|$^2$) is supplied to the DAC 14 as an output of the quantizer 100. Since a digital signal with the minimum error from the sample value X(n) is input to the DAC 14 in the low-frequency region, an analog voltage signal with a small error is generated even when the bit resolution of the DAC 14 is not so high.

The quantizer 100 selects a quantization level with which the low-frequency component of the noise $S_{noise}$ is minimized, including the clipping noise and the quantization noise among a plurality of quantization level candidates, instead of simply quantizing the sample value X(n) to a quantization level closest to the amplitude value of the sample value X(n). Therefore, accuracy of the quantization is improved.

Figures 9A, 9B, 9C:
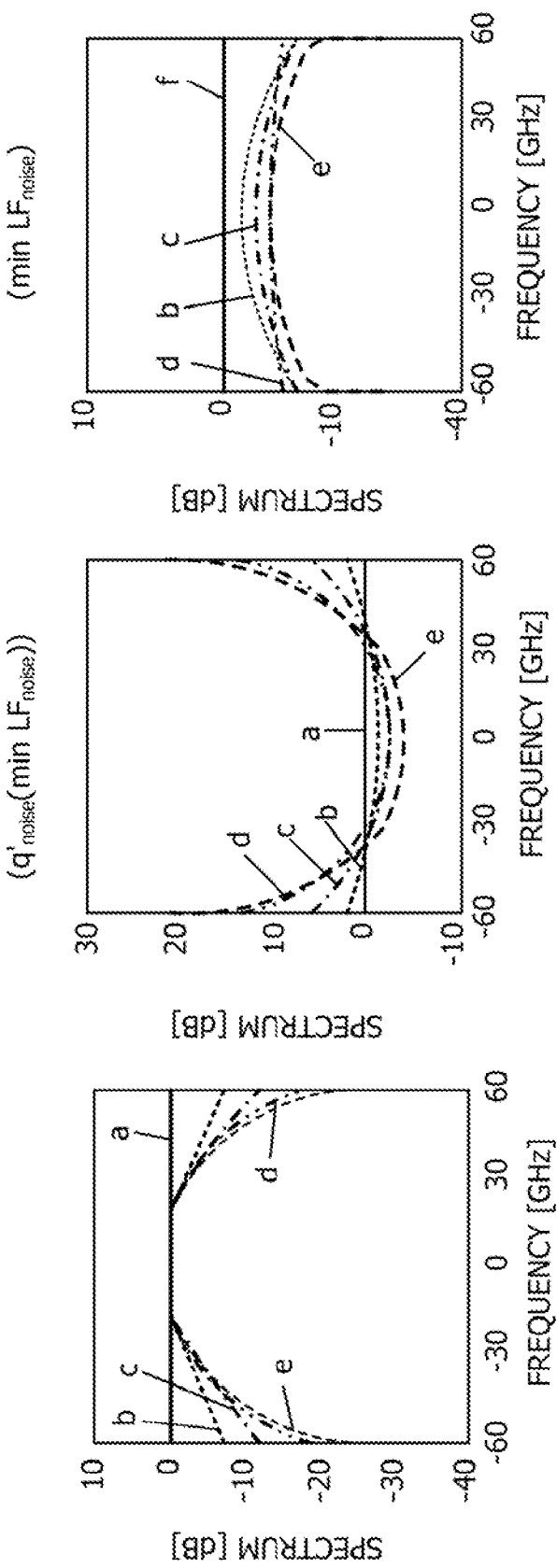
FIGS. 9A to 9C are diagrams illustrating filter characteristics of a noise shaper.

FIG. 9A illustrate filter characteristics of the noise shaper 103. FIG. 9A illustrates a frequency characteristic of the one-tap filter 111. FIG. 9B illustrates a spectrum of the shaped noise $S_{noise}$(min|$LF_{noise}$|$^2$), and FIG. 9C illustrates spectrum characteristics after one tap feedback (equalization) of the shaped noise $S_{noise}$(min|$LF_{noise}$|$^2$). In each drawing, a horizontal axis indicates a frequency (GHz), and a vertical axis indicates a gain (dB).

As illustrated in FIG. 9A, a general quantization noise a has a characteristic of a white noise flat with respect to the frequency axis. As the tap coefficient h is increased to 0.4, 0.6, 0.8, and 1.0, attenuation in a high-frequency region away from a center frequency (0 GHz) is increased, and a shape of a low-pass filter becomes steep.

In FIG. 9B, the shaped noise $S_{noise}(min|LF_{noise}|^2)$ is small in a low-frequency region, and large in a high-frequency region. As the tap coefficient h is larger, the spectrum is steeper and a noise in a low-frequency region is smaller.

FIG. 9C illustrates a spectrum shape after the spectrum in FIG. 9B is fed back to the filter characteristic in FIG. 9A. As compared with FIG. 9A, the spectrum shape in FIG. 9C is close to flat with respect to the frequency axis, and has a characteristic of white noise. Meanwhile, as the tap coefficient h is increased, a noise level is decreased, and influence on a main signal is decreased. For example, an SNR is improved. Meanwhile, a tap coefficient may not be simply increased, and as will be described below, an optimum tap coefficient may be changed depending on a degree of clipping, a sampling rate of the DAC 14, and the like.

Figure 10:
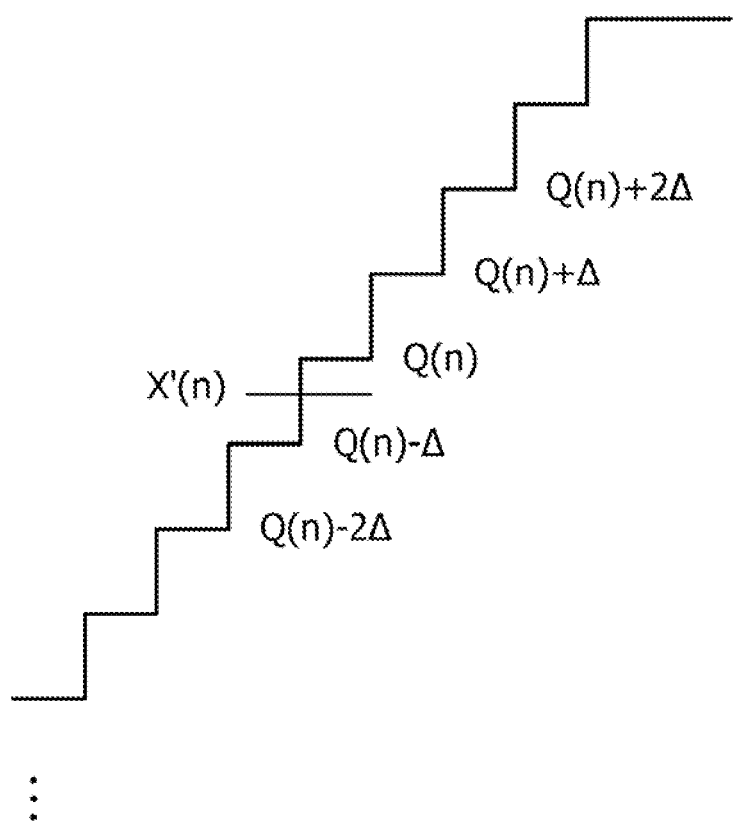
FIG. 10 is a diagram illustrating a setting of five quantization level candidates.
Figure 11:
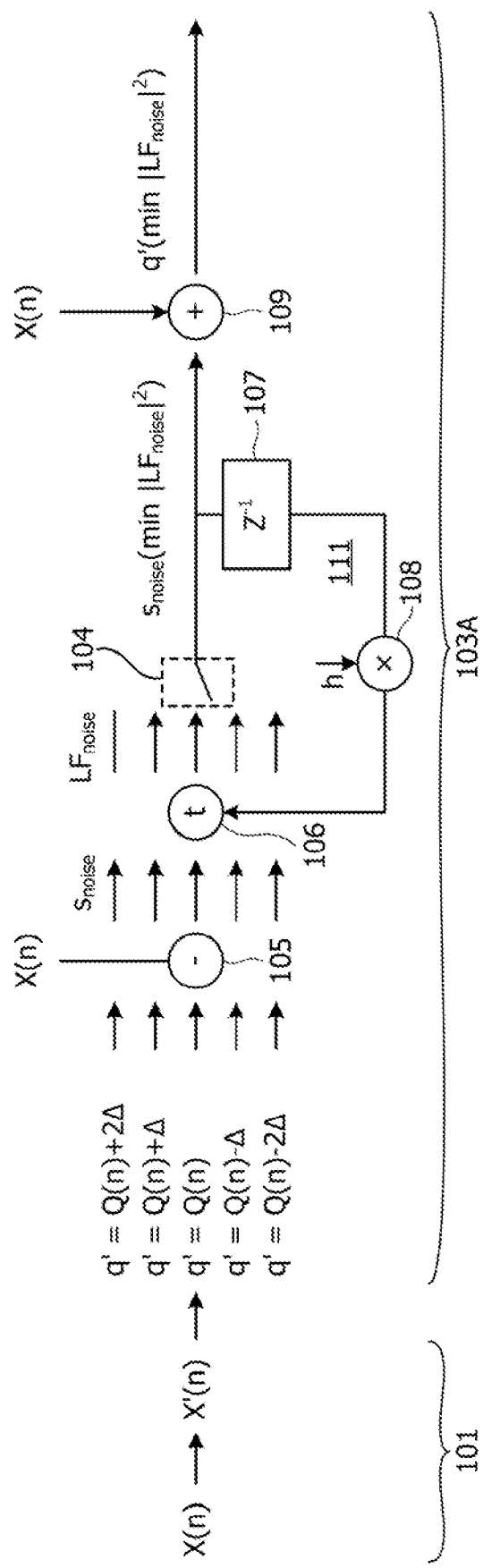
FIG. 11 is a diagram illustrating a process configuration of a quantizer using five quantization level candidates.

FIG. 10 illustrates a setting of five quantization level candidates. FIG. 11 illustrates a process configuration of a quantizer 100A using the five quantization level candidates. The quantizer 100A includes the clipper 101 and a noise shaper 103A. The process configuration of the quantizer 100A has the same manner as the process configuration of the quantizer 100 in FIG. 8 except that the number of candidates for the quantization level is increased.

A portion, exceeding a predetermined level, for example, the maximum input voltage range of the DAC 14, of the sample value X(n) input to the quantizer 100A is clipped by the clipper 101. The sample value X(n) may be expanded in the amplitude direction before being input to the clipper 101 or inside the clipper 101.

Based on the data X'(n) after clipping, the noise shaper 103A determines candidates for the quantization level. Each quantization level q', which is the candidate, is obtained as follows.

$q'=Q(n)+2\Delta$ $q'=Q(n)+\Delta$ $q'=Q(n)$ $q'=Q(n)-\Delta$ $q'=Q(n)-2\Delta$

The quantization level q' of each candidate and the sample value X(n) before clipping are input to the subtractor 105, and a difference is calculated as the noise $S_{noise}$ of each candidate. By applying the one-tap filter 111 to the noise $S_{noise}$ of each candidate, the low-frequency noise $LF_{noise}$ is extracted, and the noise $S_{noise}(min|LF_{noise}|^2)$ having the minimum absolute value of the low-frequency noise $LF_{noise}$ is selected by the selector 104.

The delayer 107 delays the selected minimum noise $S_{noise}(min|LF_{noise}|^2)$ by one symbol cycle, and the adder 109 adds the selected minimum noise $S_{noise}(min|LF_{noise}|^2)$ to the sample value X(n) in this time. By this addition, the quantization level $q'(min|LF_{noise}|^2)$ with the minimum noise in the low-frequency region is selected. Even when the bit resolution of the DAC 14 is low, the noise within the spectrum of the quantized signal may be reduced, and thus an analog voltage signal with a small error is generated.

<Effect Verification>

Figure 12:
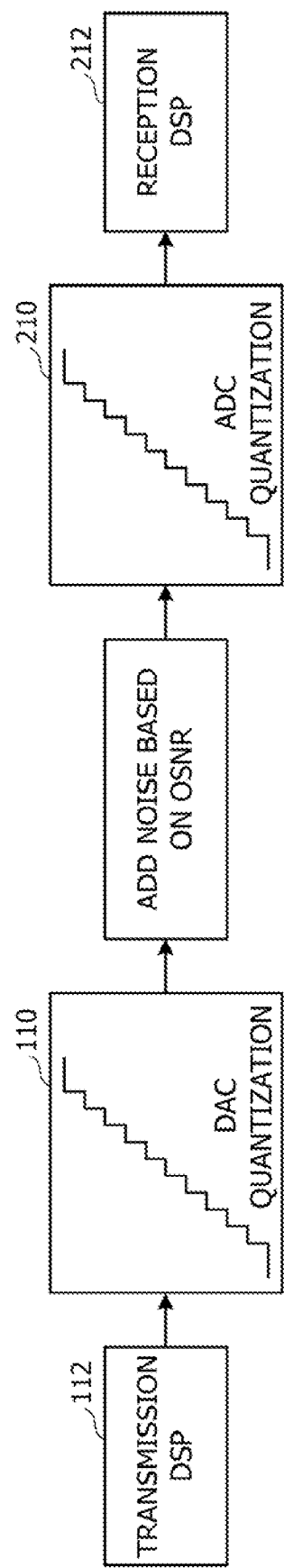
FIG. 12 is a schematic diagram of a simulation model for effect verification.

FIG. 12 is a schematic diagram of a simulation model for effect verification. A signal process is performed in a transmission DSP 112, and the sample value X(n) is output. A DAC quantizer 110 performs the quantization described above, generates an analog voltage signal from the quantized digital value, and drives an optical modulator. A noise is added to an optical signal output from the optical modulator based on an OSNR. On a reception side, the optical signal is converted into an electric signal, analog-digital conversion is performed on the electric signal by an ADC quantizer 210, and the digital signal is processed by a reception DSP 212. A bit resolution of the reception side ADC is fixed to 5 bits. In this case, a voltage value is represented by 32 stages.

Figure 13:
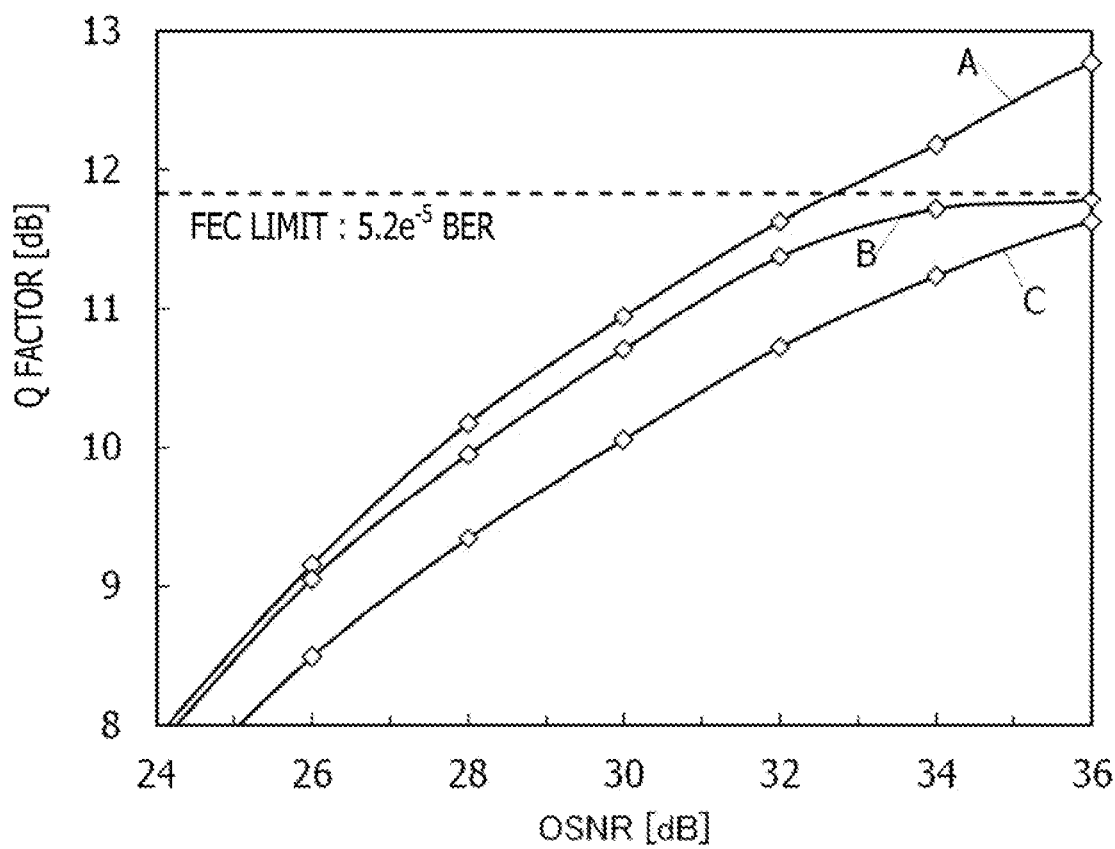
FIG. 13 is a diagram illustrating a comparison result of OSNR tolerance under a condition 1.

FIG. 13 illustrates a comparison result of OSNR tolerance under a condition 1. The condition 1 is that a bit resolution of a DAC is 3 bits, a sampling rate of the DAC is 2 sps, a main signal is Nyquist-shaped 16QAM signal, and a roll-off rate is 0.1. A horizontal axis indicates an OSNR (dB) and a vertical axis indicates a Q factor (dB).

A line A indicates the OSNR tolerance when clipping of 30% is performed in the quantizer 100 of the embodiment. A line B indicates the OSNR tolerance when clipping of 30% is introduced into the quantization model 2 in FIG. 2. A line C indicates the OSNR tolerance of the quantization model 2 in FIG. 2.

By applying clipping of 30% to the quantization model 2, the Q factor is improved. Meanwhile, even when clipping of 30% is introduced and the OSNR is increased, an FEC limit (BER $5.2e^{-5}$) is not reached. By contrast, since the quantizer 100 according to the embodiment minimizes not only the quantization noise but also the noise amount of the clipping noise in the low-frequency region, the FEC limit may be exceeded by using a DAC having a low-bit resolution.

Figure 14:
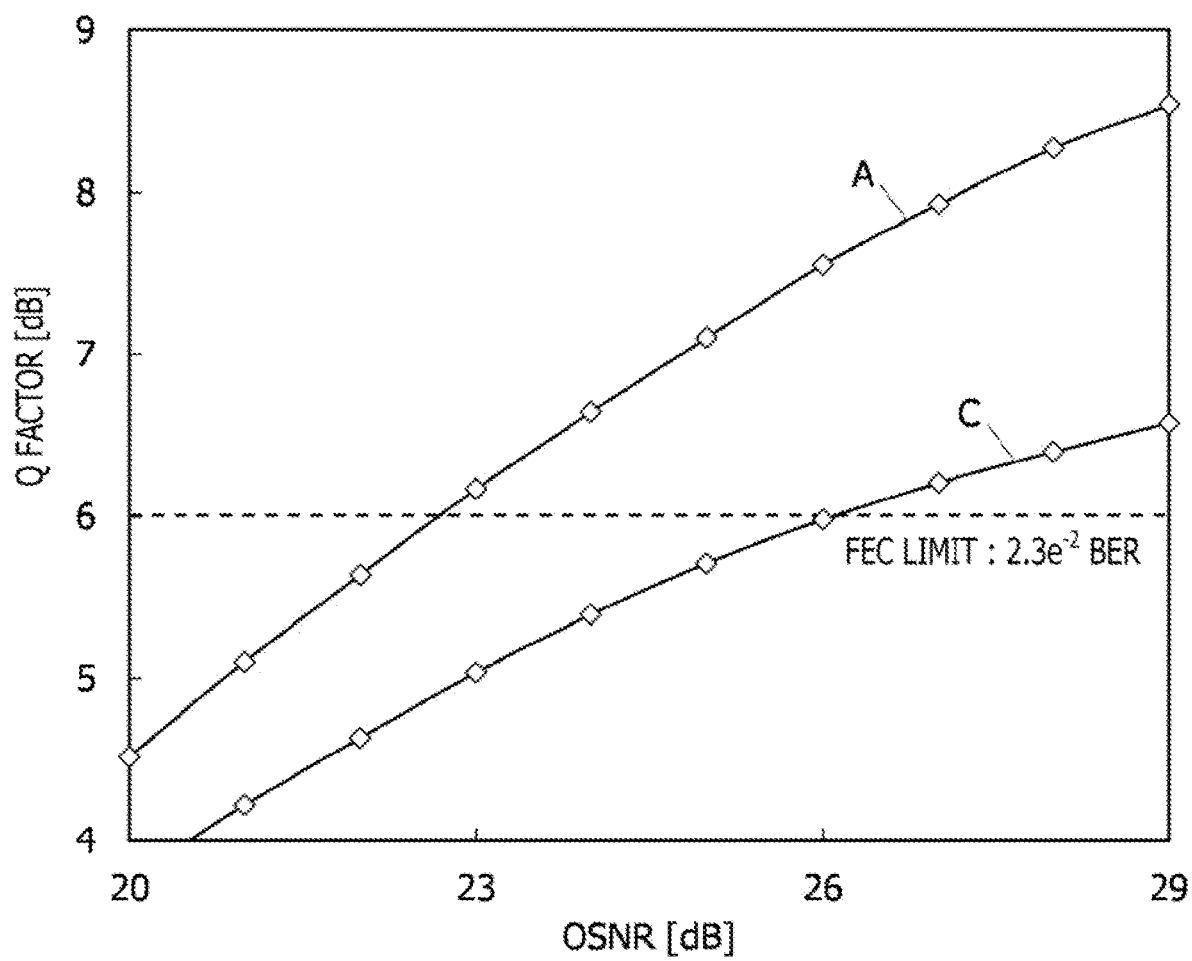
FIG. 14 is a diagram illustrating a comparison result of OSNR tolerance under a condition 2.

FIG. 14 illustrates a comparison result of OSNR tolerance under a condition 2. The condition 2 is that a bit resolution of a DAC is 2 bits, a sampling rate of the DAC is 2 sps, a main signal is Nyquist-shaped 16QAM signal, and a roll-off rate is 0.1. The bit resolution of the DAC is lower than the bit resolution of the DAC in the condition 1.

A line A indicates OSNR tolerance when clipping of 30% is performed by the quantizer of the embodiment. A line C indicates the OSNR tolerance of the quantization model 2 in FIG. 2. An FEC limit is BER $2.3e^{-2}$. By using the quantizer 100 according to the embodiment, the Q factor is improved close to 3 dB, as compared with the quantization model 2.

Figure 15:
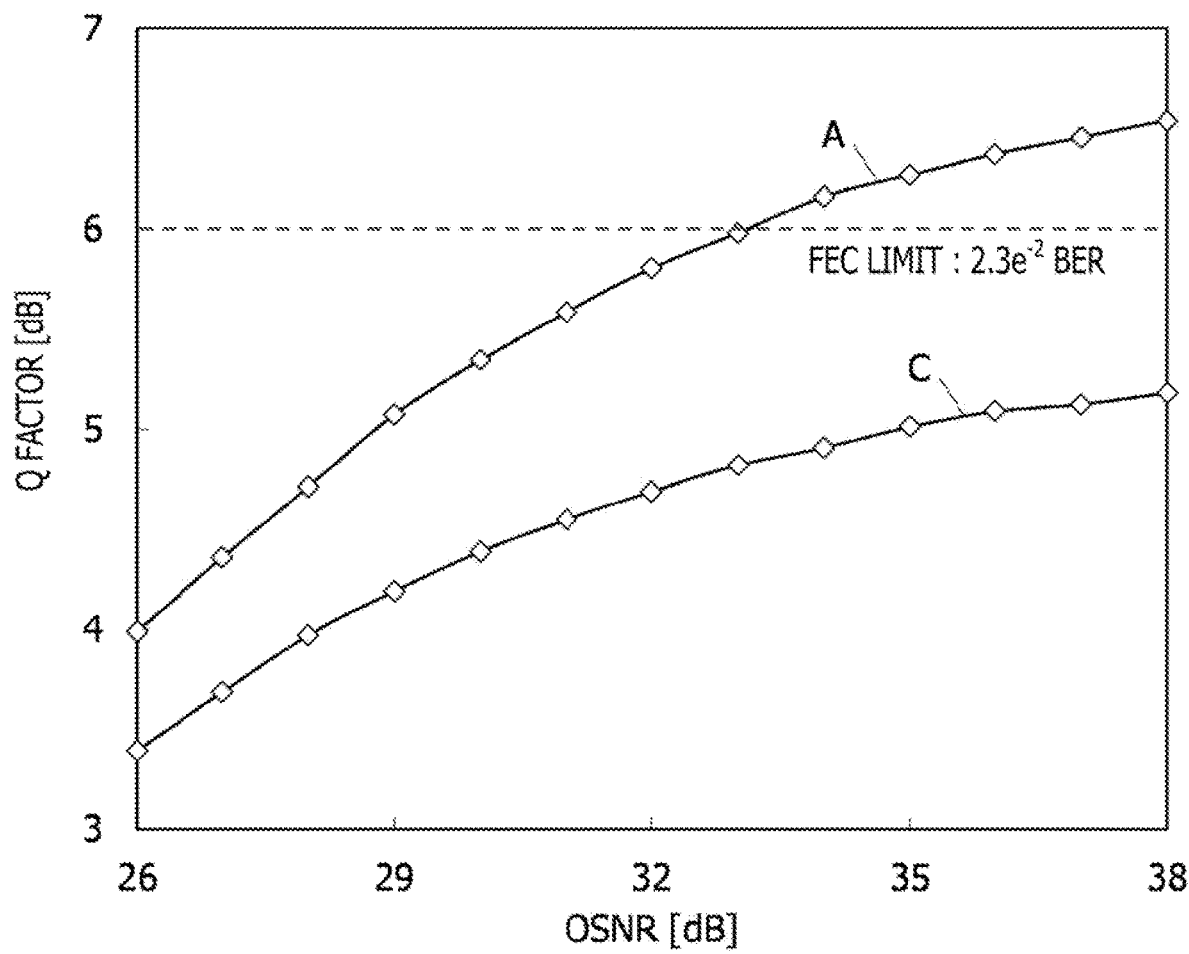
FIG. 15 is a diagram illustrating a comparison result of OSNR tolerance under a condition 3.

FIG. 15 illustrates a comparison result of OSNR tolerance under a condition 3. The condition 3 is that a bit resolution of a DAC is 3 bits, a sampling rate of the DAC is 2 sps, a main signal is Nyquist-shaped 64QAM signal, and a roll-off rate is 0.1. As compared with the conditions 1 and 2, a modulation scheme having a higher degree of multi-level is adopted.

A line A indicates OSNR tolerance when clipping of 30% is performed by the quantizer of the embodiment. A line C indicates the OSNR tolerance of the quantization model 2 in FIG. 2. An FEC limit is BER $2.3e^{-2}$.

By minimizing the quantization noise and the clipping noise in the low-frequency region with the quantizer of the embodiment, it is possible to exceed the FEC limit even when the modulation multi-level degree is high. Even when the OSNR is increased in the quantization model 2, the FEC limit may not be exceeded.

With reference to FIGS. 13 to 15, the effect of improving the Q factor by the quantizer 100 according to the embodiment is checked. Even when a DAC having a low-bit resolution is used, the desired signal quality may be maintained.

<Setting of Tap Coefficient h>

Next, a setting of the tap coefficient h will be described. An effect of suppressing a quantization noise (including clipping noise) varies depending on a value of the tap coefficient h. As described with reference to FIGS. 9A to 9C, generally, as the tap coefficient h is larger, the noise in a low-frequency region is smaller, and there is a limit to the effect of noise suppression. A limit value of noise suppression depends on a spectrum shape of the noise or a specification of a DAC.

Figure 16A:
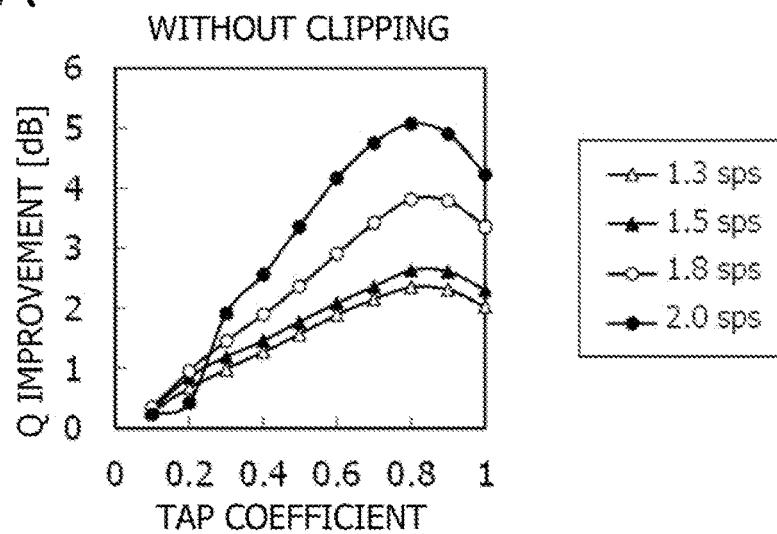
FIGS. 16A to 16C are diagrams illustrating a dependence of an optimum tap coefficient on a clipping strength and a DAC sampling rate.
Figure 16B:
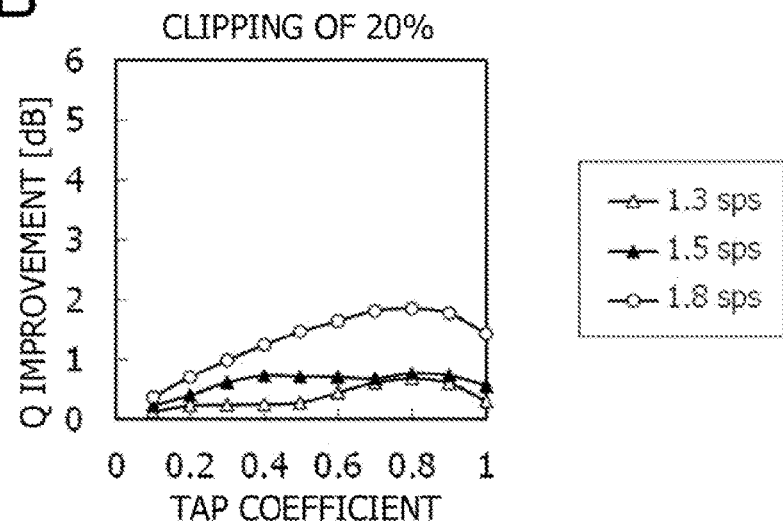
Figure 16C:
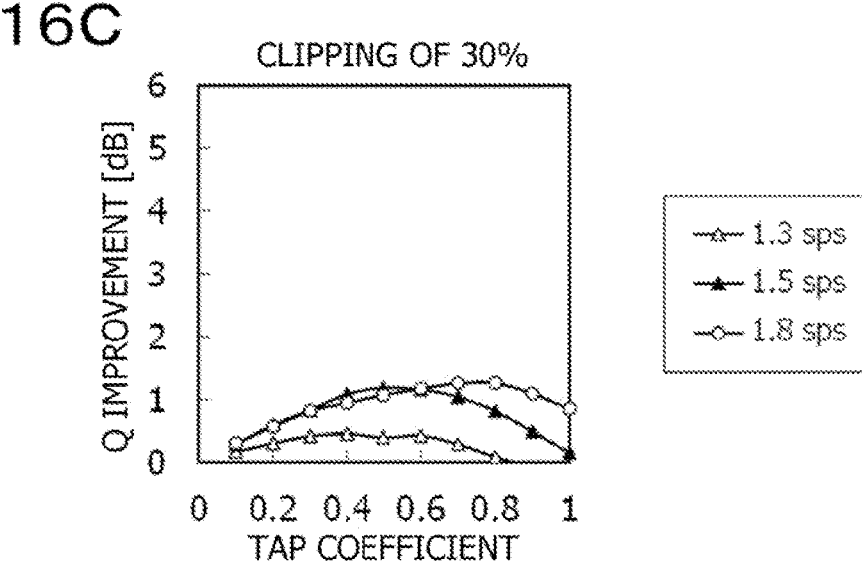

FIGS. 16A to 16C illustrate a dependence of an optimum tap coefficient on a clipping strength and a DAC sampling rate. A horizontal axis represents a tap coefficient, and a vertical axis represents a Q factor improvement effect (dB). FIG. 16A illustrates the Q factor improvement effect (dB) when the DAC sampling rate is changed with no clipping, FIG. 16B illustrates the Q factor improvement effect (dB) when the DAC sampling rate is changed with clipping of 20%, and FIG. 16C illustrates the Q factor improvement effect (dB) when the DAC sampling rate is changed with clipping of 30%, respectively. An effect of improving the Q factor is calculated based on the condition 2 in FIG. 13 described above.

In a case where clipping is not performed in FIG. 16A, the noise reduction effect of the one-tap filter 111 is maximized by setting the tap coefficient h to 0.8 regardless of the sampling rate of the DAC.

In a case where clipping of 20% is performed in FIG. 16B, when the sampling rates of the DAC are 1.3 sps and 1.8 sps, the noise reduction effect is large, and the Q factor is improved by setting the tap coefficient h to 0.8. When the sampling rate of the DAC is 1.5 sps, the tap coefficient h may take arbitrary value between 0.4 and 0.9.

In a case where clipping of 30% is performed in FIG. 16C, when the sampling rate of the DAC is 1.8 sps, the maximum Q factor improvement effect is obtained by setting the tap coefficient h to 0.8. When the sampling rate of the DAC is 1.5 sps, the maximum Q factor improvement effect is obtained by setting the tap coefficient h to 0.5. When the sampling rate of the DAC is 1.3 sps, the tap coefficient h may take arbitrary value between 0.3 and 0.6.

When the quantizer 100 (or 100A) according to the embodiment is used, the tap coefficient h of the one-tap filter 111 of the noise shaper 103 may be optimized in consideration of the clipping strength set in the clipper 101 and the sampling rate of the DAC 14.

Figure 17:
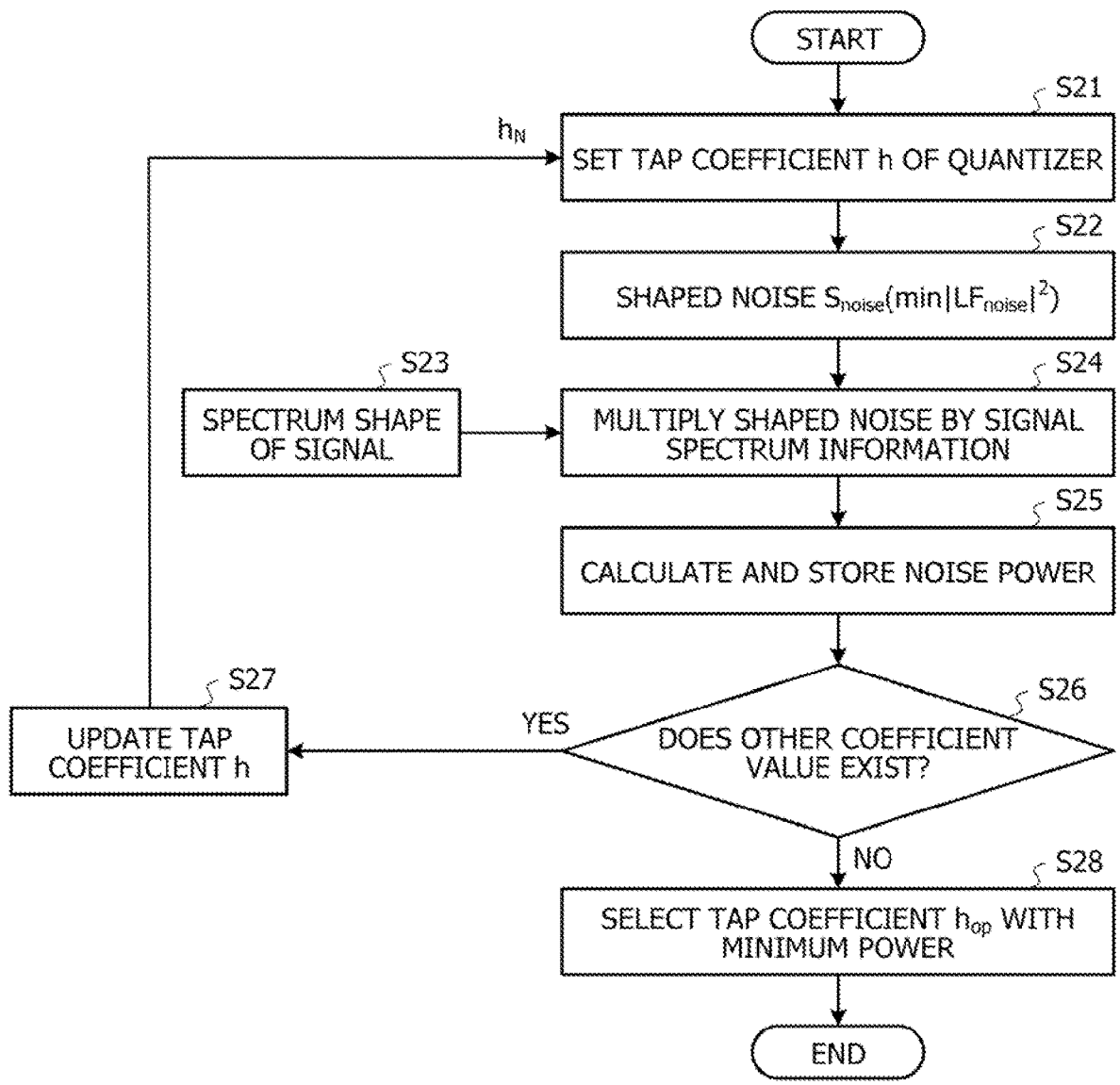
FIG. 17 is a flowchart of a method of selecting the optimum tap coefficient.

FIG. 17 is a flowchart of a method of selecting an optimum tap coefficient. Before an actual service of the optical transmitter 10, the tap coefficient h set in the one-tap filter 111 of the quantizer 100 is optimized. By varying a value of the tap coefficient h from the minimum value to the maximum value (h=1.0), the amount of noise included in a main signal is checked based on a shape of a signal spectrum, and the value of the tap coefficient that minimizes the amount of noise is selected. This process is performed by the quantizer 100.

First, the tap coefficient h is set in the one-tap filter 111 of the quantizer 100 (S21). Immediately after the process is started, the minimum value or the maximum value of a range in which the tap coefficient h is varied may be set as an initial value. By using the tap coefficient h, a shaped noise, for example, the noise $S_{noise}(\min|LF_{noise}|^2)$ in which a low-frequency noise is minimized is determined (S22).

A spectrum shape of a signal is prepared (S23), and the shaped noise $S_{noise}(\min|LF_{noise}|^2)$ is multiplied by the spectrum shape of the signal (S24). Therefore, a component within the signal spectrum, for example, a noise component is known. Power of the noise component is calculated and stored in a memory inside or outside the quantizer 100 (S25). In a case where another value to be set for the tap coefficient h exists (YES in S26), the value of the tap coefficient h is updated (S27), and steps S21 to S25 are repeated. In a case where there is no other coefficient value (YES in S26), a tap coefficient $h_{op}$ with the minimum power of the noise is selected (S28), and the process is ended.

Therefore, it is possible to set the optimum tap coefficient h for the one-tap filter 111 of the quantizer 100.

Figure 18:
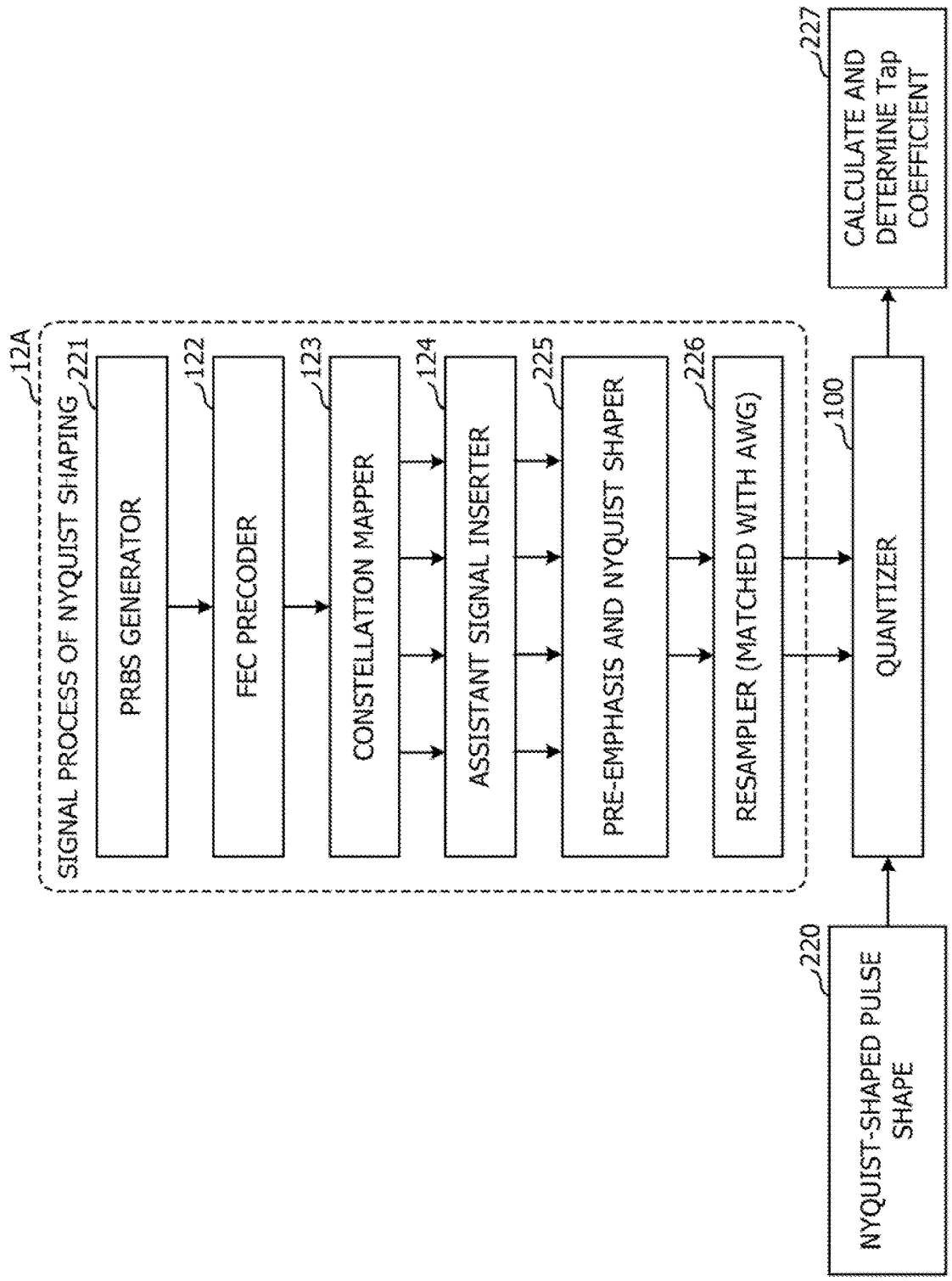
FIG. 18 is a block diagram of tap coefficient optimization using Nyquist spectrum information.

FIG. 18 is a block diagram of tap coefficient optimization using Nyquist spectrum information. In a case where a main signal is a Nyquist pulse, a Nyquist-shaped spectrum may be used as the spectrum shape in S24 in FIG. 17. In this case, the signal processor 12A generates the Nyquist pulse.

A pseudo-random binary sequence (PRBS) generator 221 generates a pseudo-random binary sequence. The FEC precoder 122 adds a forward error correction code to the binary sequence. The constellation mapper 123 performs mapping on the binary sequence to which the error correction code is added to a symbol point over a constellation. The assistant signal inserter 124 inserts a known assistant signal into each symbol point.

A pre-emphasis and Nyquist shaper 225 performs pre-emphasis and Nyquist shaping for each polarization. A resampler 226 resamples the Nyquist-shaped pulse to be matched with an arbitrary waveform generator (AWG), for example, a PRBS generator. The resampled sample value X(n) is input to the quantizer 100.

Before an actual service of the optical transmitter 10, the quantizer 100 performs the process in FIG. 17 to optimize the tap coefficient h to be set in the one-tap filter 111. The quantizer 100 sequentially sets a coefficient value for the tap coefficient h, and calculates power of a noise component by multiplying the noise $S_{noise}(\min|LF_{noise}|^2)$ shaped for minimizing a low-frequency noise by a spectrum shape of the Nyquist pulse. Among all the coefficient values, a coefficient value that minimizes noise power is selected as the tap coefficient h. By using the optimum tap coefficient h in the one-tap filter 111, accuracy of the quantization is improved.

Figure 19:
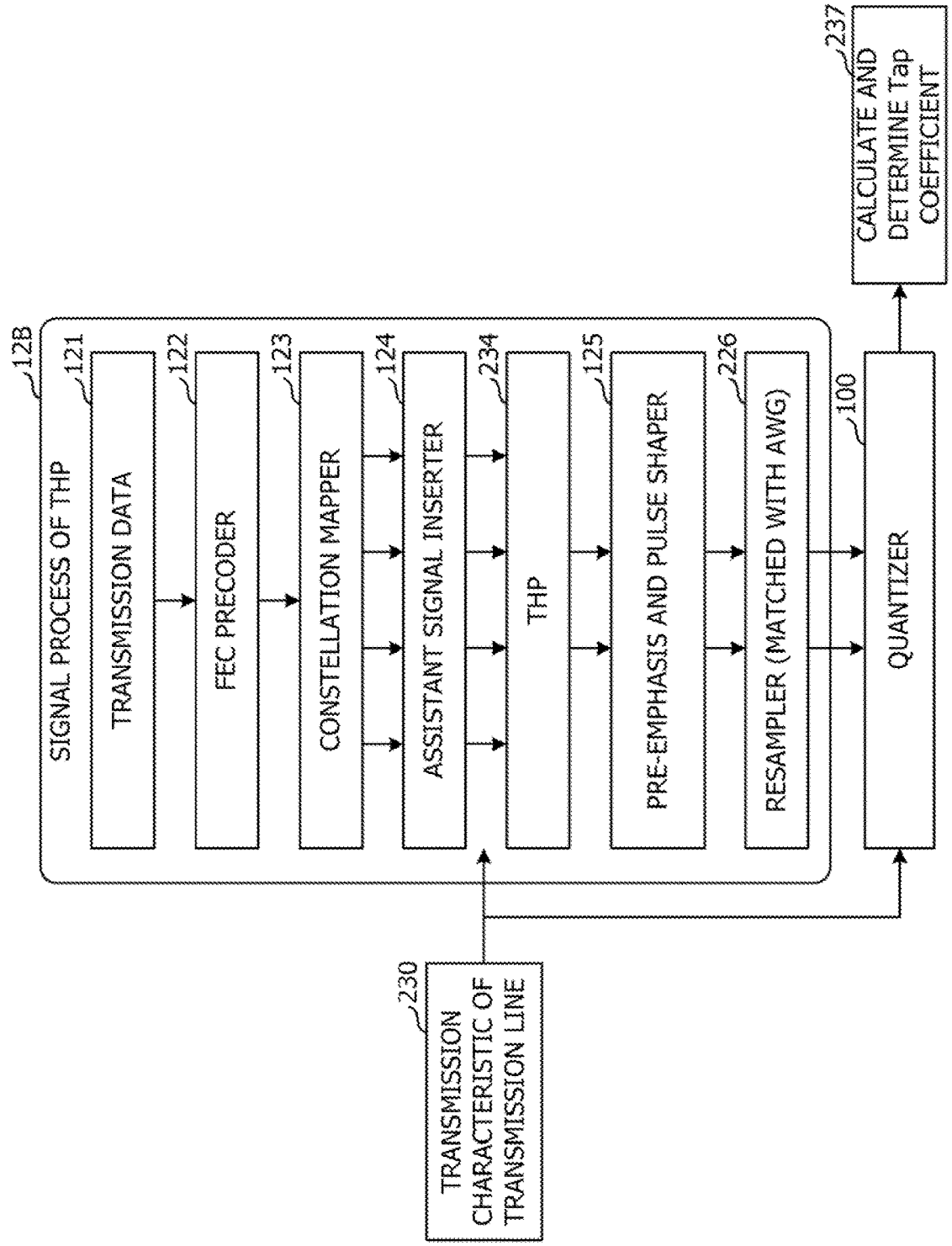
FIG. 19 is a block diagram of tap coefficient optimization using transmission characteristic information of a transmission line.

FIG. 19 is a block diagram of tap coefficient optimization using transmission characteristic information of a transmission line. In a case where a signal is transmitted at a speed higher than a bandwidth limit of the transmission line, a transmission spectrum of the transmission line may be used as spectrum information of S24 in FIG. 17, when a signal spectrum is shaped based on a transmission characteristic of the transmission line. A signal processor 12B performs a Tomlinson-Harashima precoding (THP) process. The THP is a waveform equalization technique of compensating for inter-code interference of the transmission line on the transmission side.

The FEC precoder 122 performs a forward error correction process on the transmission data 121. The constellation mapper 123 performs mapping on data on which the error correction process is to be performed to a symbol point over a constellation. The assistant signal inserter 124 inserts a known assistant signal into each symbol point. A THP circuit 234 compensates for inter-code interference in the transmission line in advance. For example, the signal spectrum is shaped based on transmission characteristics of the transmission line by a data encoding technique at each symbol point.

The pre-emphasis and pulse shaper 125 performs pre-emphasis and pulse shaping for each polarization. The resampler 226 resamples a pulse on which THP compensation and pulse shaping are performed to be matched with an AWG. The resampled sample value X(n) is input to the quantizer 100.

Before an actual service of the optical transmitter 10, the quantizer 100 performs the process in FIG. 17 to optimize the tap coefficient h to be set in the one-tap filter 111. The quantizer 100 sequentially sets a coefficient value for the tap coefficient h, and calculates power of a noise component by multiplying the noise $S_{noise}(min|LF_{noise}|^2)$ shaped for minimizing a low-frequency noise by the transmission characteristics of the transmission line. Among all the coefficient values, a coefficient value that minimizes noise power is selected as the tap coefficient h.

According to the configurations illustrated in FIGS. 18 and 19, it is possible to set the optimum tap coefficient h corresponding to the characteristics of the Nyquist pulse and the transmission line that are actually used in the quantizer 100. As a result, the effect of reducing a low-frequency noise may be improved, accuracy of the analog drive signal for driving the optical modulator 17 may be improved, and the Q factor of the transmission signal may be improved.

Hereinbefore, the embodiment is described based on the specific configuration examples, and the present disclosure is not limited to the configuration examples described above. For example, the number of candidates for the quantization level may be an appropriate number equal to or greater than 2 in accordance with the bit resolution of the DAC 14. A clipping ratio may be appropriately set such as a 10%, 20% in consideration of the maximum input voltage range of the DAC 14.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A quantizer comprising:
a clipper circuit configured to remove a value exceeding a quantization range of a sample value which is sampled from a transmission data at a predetermined rate which is higher than a frequency of the transmission data and obtain clipped sample values; and
a noise shaper circuit coupled to an output of the clipper circuit and configured to determine a plurality of candidates for a quantization level based on each of the clipped sample values, obtain a value by adding a minimum noise in which a noise in a specific frequency region is minimum among noises generated in each candidate to the sample value and output an obtained value as a quantization value.

2. The quantizer according to claim 1, wherein the noises include a clipping noise caused by an operation to remove the value and a quantization noise caused by a quantization.

3. The quantizer according to claim 1, further comprising a filter configured to extract a specific frequency component of the noise.

4. The quantizer according to claim 3, wherein the filter includes an adder configured to add the minimum noise before one symbol to the noise generated in each candidate, a delayer configured to delay the minimum noise in a current symbol by one symbol cycle, and a multiplier configured to multiply the minimum noise delayed by the delayer by a coefficient, and an output of the multiplier is coupled to an input of the adder.

5. The quantizer according to claim 4, wherein the coefficient is set to a value to set the noise to the minimum noise, in accordance with a spectrum shape of a main signal or a transmission characteristic of a transmission line.

6. The quantizer according to claim 4, further comprising a selection circuit configured to select the minimum noise from outputs of the adder.

7. The quantizer according to claim 1, further comprising a second adder configured to add the minimum noise to the sample value.

8. An optical transmitter comprising:
a signal processor that outputs a sample value;
a quantizer;
a digital-to-analog converter that performs analog conversion on a quantization value; and
an optical modulator that is driven based on an output of the digital-to-analog converter,
the quantizer includes:
a clipper circuit configured to remove a value exceeding a quantization range of the sample value which is sampled from a transmission data at a predetermined rate which is higher than a frequency of the transmission data and obtain clipped sample values; and
a noise shaper circuit coupled to an output of the clipper circuit and configured to determine a plurality of candidates for a quantization level based on each of the clipped sample values, obtain a value by adding a minimum noise in which a noise in a specific frequency region is minimum among noises generated in each candidate to the sample value and output an obtained value as a quantization value.

9. The optical transmitter according to claim 8, wherein the quantizer receives, from the signal processor, the sample value which is expanded in an amplitude direction to exceed a maximum input voltage range of the digital-to-analog converter.

* * * * *